Oct. 9, 1951  N. B. MURPHY  2,570,585
DISCONNECT DEVICE
Filed June 26, 1944  2 Sheets-Sheet 1

INVENTOR.
Norman B. Murphy
BY
ATTORNEY

INVENTOR.
Norman B. Murphy
BY
ATTORNEY

Patented Oct. 9, 1951

2,570,585

UNITED STATES PATENT OFFICE 2,570,585

DISCONNECT DEVICE

Norman B. Murphy, West Englewood, N. J., assignor to Bendix Aviation Corporation, Teterboro, N. J., a corporation of Delaware Application June 26, 1944, Serial No. 542,063

8 Claims. (Cl. 192—56)

This invention relates to disconnect apparatus and more particularly to emergency disengaging means for automatic control systems for aircraft.

In the use of automatic control devices such as, for example, automatic pilots for aircraft it is desirable to provide releasable couplings between the various servo motors and the control surfaces they operate whereby in the event of an emergency the surfaces may be readily disconnected from the control of the motors and placed under manual control of the human pilot. It is, moreover, desirable that the releasable couplings be operated by the human pilot in response to actuation of the manual controls for the surfaces so that no separate means need be relied upon to assure the desired disconnection.

An object of the present invention, therefore, is to provide a novel releasable coupling which is rapidly and positively operable to disconnect a driven member from a driving member.

Another object of the invention is to provide a novel emergency disconnect device for use with automatic pilots in aircraft whereby a control surface may be rapidly uncoupled from a driving motor.

A further object is to provide a novel emergency disconnect device for use with automatic pilots in aircraft whereby the control surfaces may be readily disconnected from their related driving motors upon the application of a force to the usual manual controls for the surfaces.

Another object of the invention is to provide a novel emergency disconnect device for use with automatic pilots having a driving member coupled with a servomotor and a driven member coupled with a control surface as well as with the manual control for that surface, together with a driving arm carried by the driving member and yieldably urged into driving engagement with the driven member, the arrangement being such that a pawl is held by a latch for maintaining the driving arm in engagement with the driven member, the latch responding to pressure applied to the manual control to release the pawl whereby the driving arm is disengaged from the driven member, means being provided, furthermore, for returning the pawl to a given position to re-establish the driving connection between said members.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views.

Figure 1:
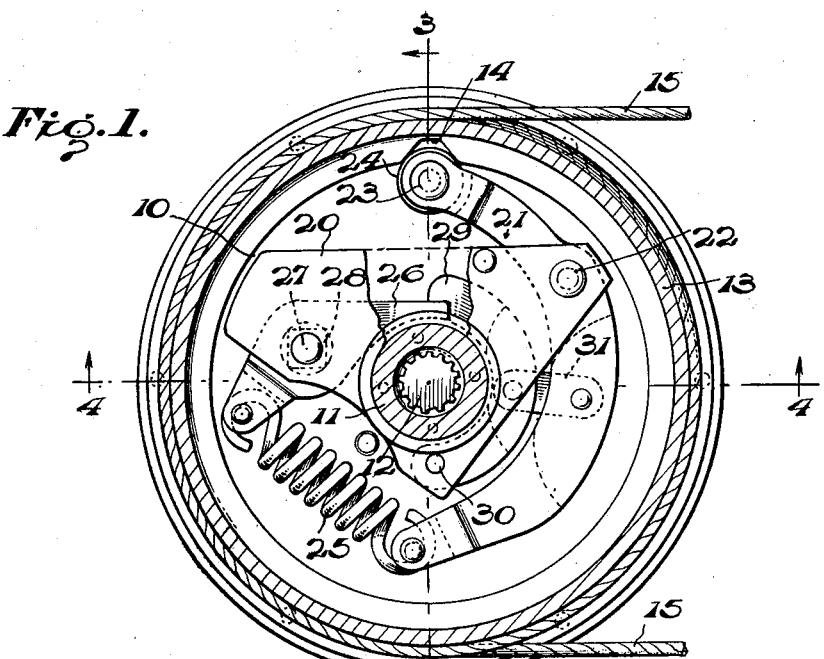
Figure 1 is an end elevation view in section of the novel disconnect device of the present invention.
Figure 2:
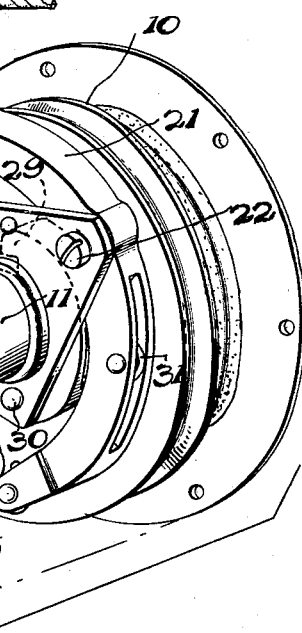
Figure 2 is an exploded perspective view of the device of Figure 1.

Referring now to the drawings for a more detailed description of the present invention, the novel emergency disconnect is shown in Figure 2 as comprising a driving member 10 having a splined hub 11 for the reception of a shaft 12 (Figure 1) of a suitable servomotor (not shown). Sleeved about driving member 10 is a driven member 13 provided with a notch 14 at the interior thereof for a purpose to presently appear and having suitable grooved portions at its outer periphery for the reception of cables 15 which connect with main cables (not shown) connected to a control surface as well as to a manual control for operating that surface.

Hub 11 of driving member 10 passes through an opening 16 formed in the end of driven member 13 and surrounding the opening is an annular flange 17 having secured thereto a cover plate 18. When the driven member 13 is assembled on the driving member the hub 11 enters opening 16 and fastened to the end of the hub is a retainer disc 19 which rests about opening 16 to thereby maintain the driving and driven members in an assembled condition.

A bracket 20 is rigidly fastened to driving member 10 and spaced therefrom and interposed between the bracket and the driving member is an arcuate driving link 21 which is pivotally supported between the bracket and driving member by means of a pin 22. One end of the link is bifurcated and supports a transverse shaft 23 therein for mounting a roller 24 thereon for engagement within notch 14 of the driven member in a manner to presently appear, the other end of the link having one end of a relatively heavy spring 25 anchored thereto, the free end of the spring being connected to the split end of a pawl 26 which is pivotally supported between bracket 20 and the driving member by means of a pin 27 journalled for angular motion within the bracket and the driving member.

Pin 27 extends through driving member 10 and has a tool engaging portion 28 at the exterior of the member whereby upon actuation of the pin exterior of the unit, pawl 26 will be rotated clockwise, as viewed in Figure 2, until it is caused to rest against hub 11. It will be apparent that movement of the pawl to engage the hub, loads spring 25 whereby link 21 is pivoted about pin 22 to urge roller 23 into notch 14.

To the end that the driving connection between the driving and driven members resulting from cooperation of roller 23 with notch 14 may be desirably maintained, a locking feature is provided for maintaining the pawl against hub 11 in which position the spring is operative to yieldably urge the driving link toward the driven member, such feature residing in an arcuate latch member 29 pivoted at 30 and normally holding the pawl against the hub. A lever 31, better shown in Figure 1, connected to link 21 below its pivot point, connects with latch 29 above the pivot point of the latter so that in response to counterclockwise motion of link 21 about its pivot, lever 31 is urged outwardly with the link thereby pivoting latch 29 about its pivot away from pawl 26 whereupon spring 25 pivots the pawl to the left about the pivot of the latter to release the force normally applied to the driving link to maintain a drivable connection between the two members.

Figure 3:
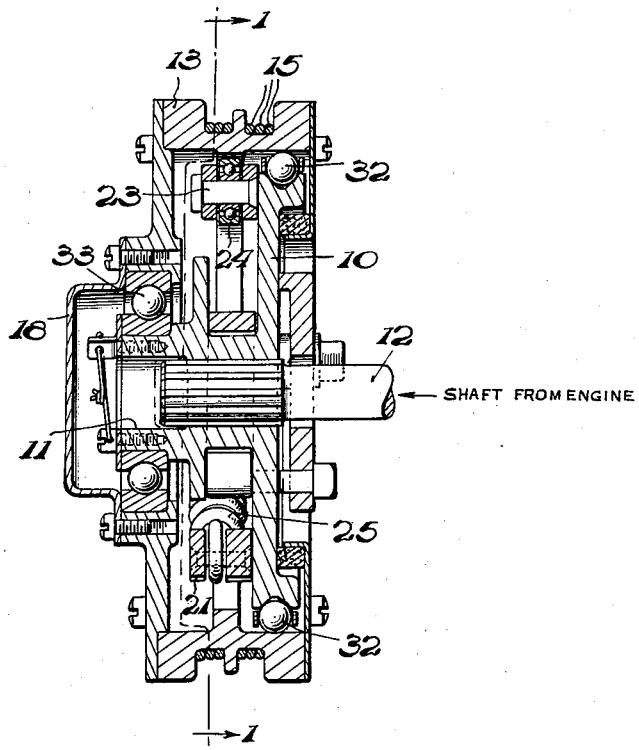
Figure 3 is a sectional view taken substantially along line 3—3 of Figure 1; and, Figure 4 is a sectional view taken substantially along line 4—4 of Figure 1.
Figure 4:
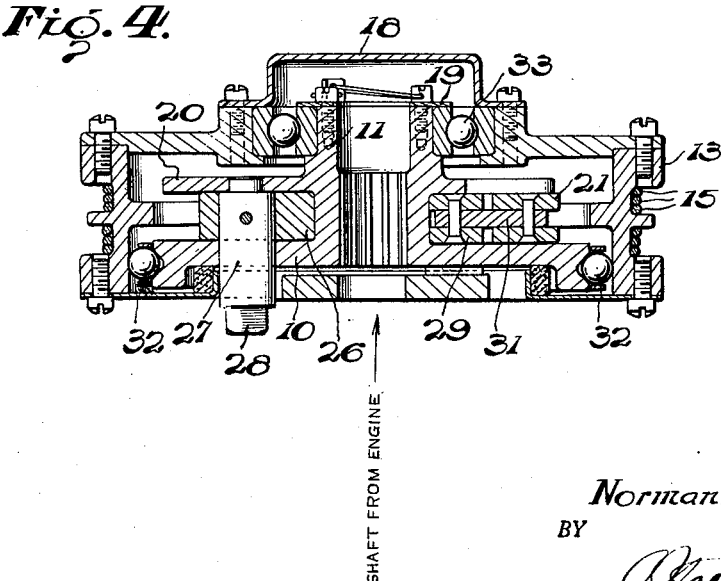

In order to assure a frictionless drive between the driving and driven members when the emergency coupling has been disconnected, the outer periphery of the driving member is provided with a groove for maintaining ball bearings 32 therein which engage the driven member as better shown in Figures 3 and 4. To the same end, other ball bearings 33 may also be provided between hub 11 and the driven member.

If the driving member has been disconnected from the driven member and it is desired to establish a drivable connection therebetween whereby a control surface may be operated from a servomotor, the operator, by means of a suitable tool, actuates pin 27 to rotate pawl 26 into engagement with hub 11 thereby stressing spring 25 to pivot link 21 about point 22 to urge roller 24 against the driven member. At the same time and by virtue of lever 31, latch 29 is moved to lock pawl 26, as shown in Figure 1. Subsequent to the foregoing operation, the control cables are operated manually so that driven member 13 is moved relative to the driving member until notch 14 reaches a position adjacent the roller whereupon due to the action of spring 25 the roller falls into the notch thereby establishing a drivable connection between the two members and the control surface is thereafter controlled from its related servomotor.

When it is desired to re-assume manual control of the craft actuating surfaces, the manual controls are operated whereby a predetermined load is imposed upon driven member 13. When this occurs, the driving link and roller, being under the influence of the servomotor, develop relative motion with respect to the driven member so that the roller disengages notch 14 to engage the inner portion of member 13, causing driving link 21 to pivot about 22 to the left so that lever 31 is moved to the right carrying latch 29 therewith about its pivot 30 to unlock pawl 26 whereupon the latter, under the action of spring 25, is swung about its pivot. The spring is thus collapsed so that the resilient force normally acting on the driving link is eliminated. Thereafter, the driven member is free of the driving member so that manual control of the surface is possible.

To re-establish the drivable connection between the servomotor and the control surface, pin 27 is actuated until pawl 26 swings to the right to engage hub 11. Thereafter, the manual control is operated until notch 14 of the driven member is brought adjacent the roller at which time spring 25 urges the roller into the notch and, at the same time, latch 29 is effective to lock pawl 26 in its last described position.

Although but a single embodiment of the present invention has been illustrated and described in detail, it is to be expressly understood that the invention is not limited thereto. Various changes may be made in the design and arrangement of parts without departing from the spirit and scope of the invention as will now be understood by those skilled in the art. For a definition of the limits of the invention, reference will be had primarily to the appended claims.

I claim:

1. In combination, a driving member, a driven member, means comprising a driving link pivotally supported on said driving member and adapted for drivably engaging said driven motor, means comprising a pawl for yieldably urging said link into engagement with said driven member, a latch normally locking said pawl whereby a drivable connection is maintained between said members, means interconnecting said link and said latch whereby said latch is actuated to release said pawl in response to relative motion between said driving and driven members, and means for providing relative motion between said driving and driven members.

2. In combination, a driving member and a driven member, a movable element on one of said members, registering means on the other of said members, means comprising a normally biased spring member for yieldably holding said element in registry with said registering means whereby motion of said driving member is transmitted to said driven member, said registering means being arranged to force the movable element from out of registry therewith in response to relative motion between said driving and driven members to discontinue the driving connection between said members, and means connected with said movable element normally maintaining said spring member biased and responsive to movement of said element from out of registry with said registering means to release said holding means and to thereby un-bias said spring members.

3. In combination, a driving member and a driven member, a movable element on one of said members, registering means on the other of said members, means for yieldably holding said element in registry with said registering means whereby motion of said driving member is transmitted to said driven member, said registering means being arranged to force the movable element from out of registry therewith in response to relative motion between said driving and driven members to discontinue the driving connection between said members, means comprising a latch for locking said holding means to maintain said element in registry with said registering means, and means connecting said latch with said movable element whereby in response to movement of the latter from out of registry with said registering means said latch is operated to release said holding means.

4. In combination, a driving member and a driven member, a movable element on one of said members, registering means on the other of said members, means for yieldably holding said element in registry with said registering means whereby motion of said driving member is transmitted to said driven member, said registering means being arranged to force the movable element from out of registry therewith in response to relative motion between said driving and driven members to discontinue the driving connection between said members, means connected with said movable element and responsive to movement of the latter from out of registry with said registering means to release said holding means, and means for operating said holding means whereby in response to relative motion between said driving and driven members said movable element is yieldably urged into registry with said registering means to re-establish the driving connection between said driving and driven members.

5. An emergency disconnect device comprising a driving member and a driven member, a driving link pivotally mounted on one of said members, registering means on the other of said members, means comprising a pawl for yieldably holding said link in registry with said registering means whereby motion of said driving member is transmitted to said driven member, said registering means being arranged to force the driving link from out of registry therewith in response to relative motion between said driving and driven members to discontinue the driving connection between said members, means for locking said pawl to maintain said link in registry with said registering means, and means responsive to movement of said link from out of registry with said registering means for operating said locking means to release said pawl.

6. An emergency disconnect device comprising a driving member and a driven member, a driving link pivotally mounted on one of said members, registering means on the other of said members, means comprising a pawl for yieldably holding said link in registry with said registering means whereby motion of said driving member is transmitted to said driven member, said registering means being arranged to force the driving link from out of registry therewith in response to relative motion between said driving and driven members to discontinue the driving connection between said members, a pivoted latch for locking said pawl to maintain said link in registry with said registering means, and means connecting said latch to said link whereby in response to movement of said link from out of registry with said registering means said latch is operated to release said pawl.

7. In combination, a driving member and a driven member, a pivotally mounted link on one of said members, means on the other of said members providing a high surface and a low surface, means for yieldably holding said link in registry with one of said surfaces whereby motion of said driving member is transmitted to said driven member, said link being movable from said one surface to the other of said surfaces in response to relative motion between said driving and driven members to discontinue the driving connection between the two members, a latch for locking said holding means to maintain said link in registry with said one surface, and means responsive to movement of said link from said one surface to said other surface for operating said latch to release said holding means.

8. An emergency disconnect device comprising a driving member and a coaxially mounted driven member sleeved for motion relative to said driving member, a driving link movably mounted on said driving member, a notch formed in the inner periphery of said driven member, means comprising a normally tensioned spring member for yieldably holding said link in registry with said notch whereby motion of said driving member is transmitted to said driven member, said link being forced out of said notch to the inner periphery of said driven member in response to relative motion between said driving and driven members to discontinue the driving connection between said members, and means normally maintaining said spring member tensioned and responsive to movement of said link from out of said notch to release said holding means and to thereby release the tension on said spring member.

NORMAN B. MURPHY.

REFERENCES CITED

The following references are of record in the file of this patent:

UNITED STATES PATENTS

| Number | Name | Date |
|---|---|---|
| 1,548,427 | Aldeen | Aug. 4, 1925 |
| 1,883,225 | Wood | Oct. 18, 1932 |
| 1,953,430 | Parre | Apr. 3, 1934 |
| 2,003,115 | Grohn | May 28, 1935 |
| 2,100,562 | Lippold | Nov. 30, 1937 |
| 2,255,211 | Gebert | Sept. 9, 1941 |